United States Patent
Scheuermann

(10) Patent No.: US 8,103,972 B2
(45) Date of Patent: Jan. 24, 2012

(54) OPERATOR CONTROL UNIT AND METHOD FOR ASSIGNING AN ON-SCREEN DISPLAY TO A SOFTKEY BUTTON

(75) Inventor: Uwe Scheuermann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 440 days.

(21) Appl. No.: 12/339,903

(22) Filed: Dec. 19, 2008

(65) Prior Publication Data

US 2009/0171483 A1 Jul. 2, 2009

(30) Foreign Application Priority Data

Dec. 27, 2007 (EP) .................................. 07025143

(51) Int. Cl.
*G06F 3/048* (2006.01)
*G06F 3/02* (2006.01)
*G05B 11/01* (2006.01)
*G05B 15/00* (2006.01)

(52) U.S. Cl. ........ 715/847; 715/810; 715/840; 715/771; 345/172; 700/17; 700/83

(58) Field of Classification Search ............... 715/826, 715/810, 840, 771, 847; 345/172; 700/17, 700/83, 84, 85
See application file for complete search history.

(56) References Cited

U.S. PATENT DOCUMENTS

| | | | | |
|---|---|---|---|---|
| 5,124,908 A * | 6/1992 | Broadbent | ...................... | 700/83 |
| 5,321,420 A * | 6/1994 | Rezek et al. | ............... | 345/440.1 |
| 6,389,325 B1 * | 5/2002 | Rutkowski | .................... | 700/180 |
| 6,775,598 B2 * | 8/2004 | Bergmann et al. | ................ | 701/1 |
| 7,661,073 B2 * | 2/2010 | Lausterer et al. | ............. | 715/810 |
| 2003/0090471 A1 * | 5/2003 | Slaunwhite et al. | .......... | 345/172 |
| 2004/0239637 A1 * | 12/2004 | Williams et al. | .............. | 345/172 |
| 2008/0024458 A1 * | 1/2008 | Nieminen | ..................... | 345/173 |
| 2008/0046842 A1 * | 2/2008 | Kim | ............... | 715/847 |
| 2008/0153546 A1 * | 6/2008 | Gupta et al. | .................. | 455/558 |

FOREIGN PATENT DOCUMENTS

EP 1482398 A2 12/2004

* cited by examiner

*Primary Examiner* — Tadeese Hailu
*Assistant Examiner* — Nicholas Ulrich
(74) *Attorney, Agent, or Firm* — Henry M. Feiereisen; Ursula B. Day

(57) ABSTRACT

A method and operator control unit is disclosed that uses a screen, softkey buttons and an operating button. If, after a first on-screen display is invoked by briefly pressing a softkey button, the operating button is then pressed while that first on-screen display is displayed on the screen, a user menu is displayed as a second on-screen display on the screen. Then, a softkey button is pressed for a longer length of time while the user menu is displayed, the softkey button pressed in this manner becomes a shortcut on the user menu. The shortcut allows the user to directly invoke said first on-screen display from the user menu. Thus, the operating button provides a user-selected menu of shortcuts that gives the user direct access to predetermined softkey on-screen displays.

8 Claims, 2 Drawing Sheets

Prior Art
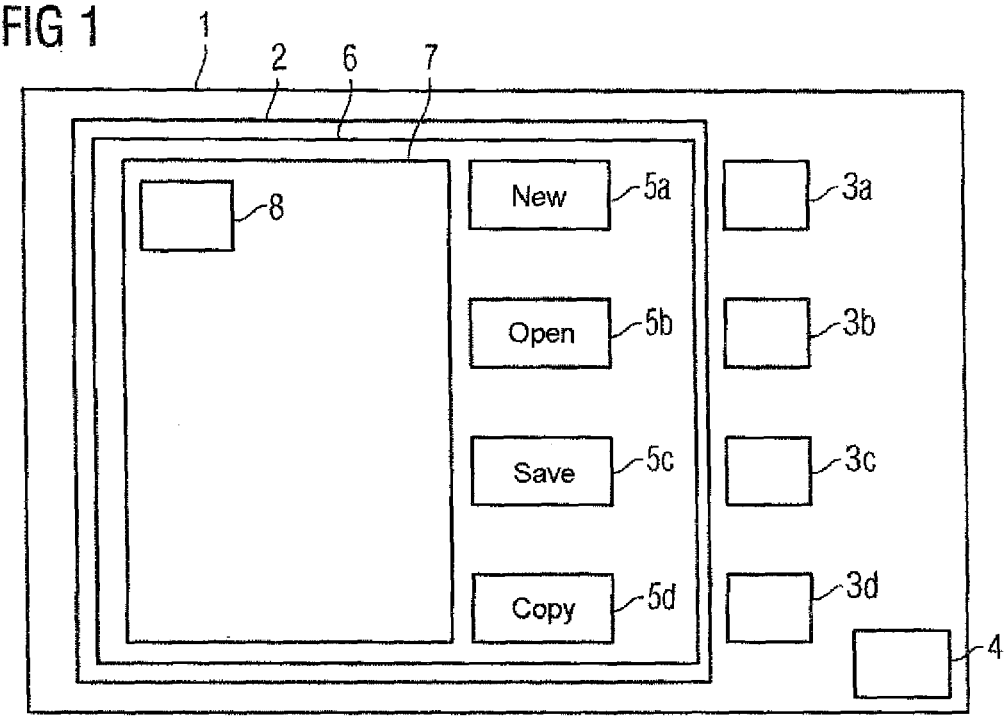
Prior Art
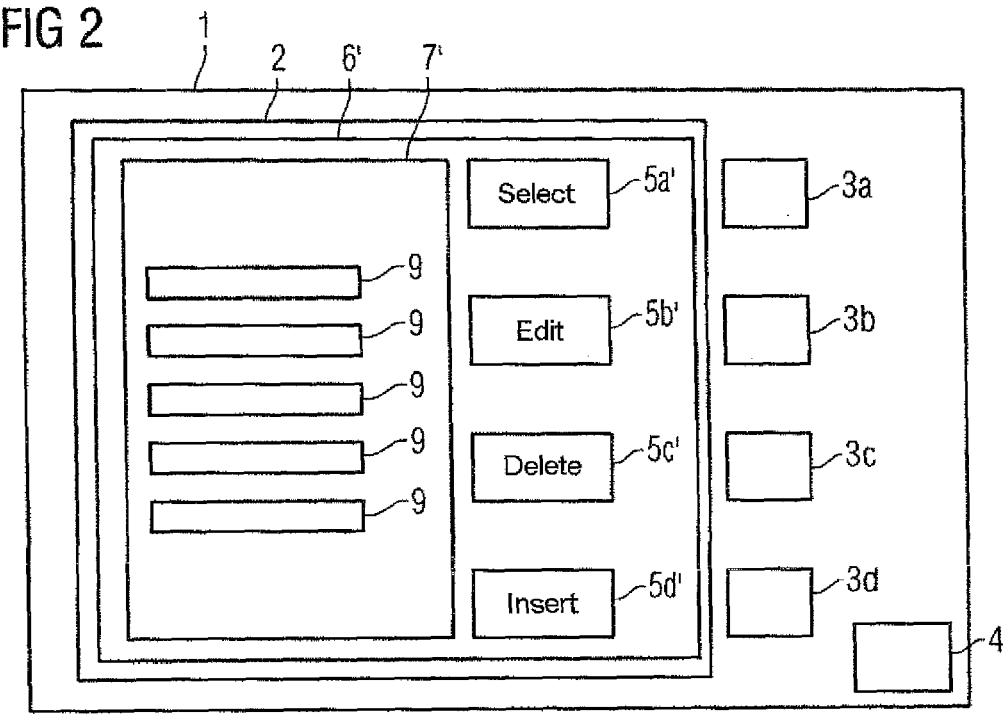

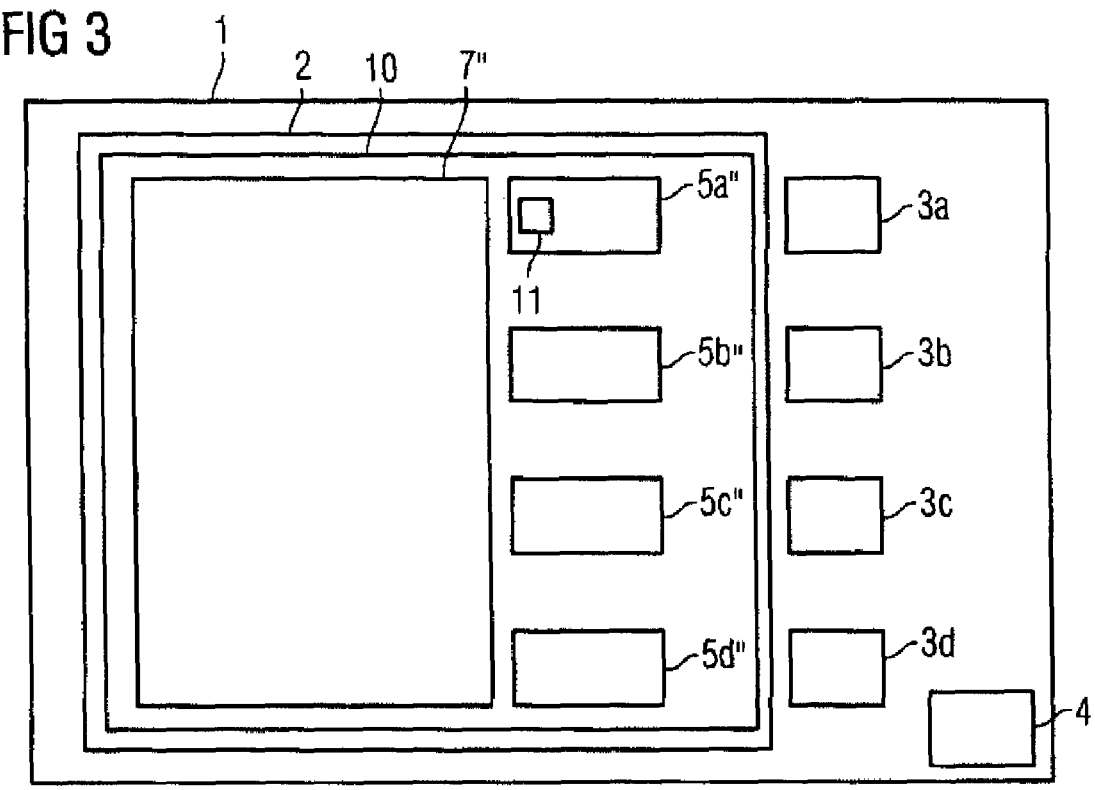

OPERATOR CONTROL UNIT AND METHOD FOR ASSIGNING AN ON-SCREEN DISPLAY TO A SOFTKEY BUTTON

CROSS-REFERENCES TO RELATED APPLICATIONS

This application claims the priority of European Patent Application, Serial No. 07025143, filed Dec. 27, 2007, pursuant to 35 U.S.C. 119(a)-(d), the content of which is incorporated herein by reference in its entirety as if fully set forth herein.

BACKGROUND OF THE INVENTION

The invention relates to an operator control unit for operating a machine tool, a production machine, a crane and/or a robot. More particularly, the invention relates to a method for assigning an on-screen display to a softkey button in an operator control unit for operating a machine tool, a production machine, a crane and/or a robot.

Nothing in the following discussion of the state of the art is to be construed as an admission of prior art.

Machine tools, production machines, cranes and/or robots are customarily operated using operator control units that have suitable operating buttons. What are known as softkey buttons are increasingly being used in this case. A softkey button denotes a button that performs different functions depending on an on-screen display shown on a screen of the operator control unit.

Softkey buttons in an operator control unit for operating a machine tool, a production machine, a crane and/or a robot are customarily assigned by means of complex changes to configuration files or via complex, a long-winded sequence of additional operating dialog screens.

In commercially available operator control units, if an operator wishes to execute a particular control action, at present he must often perform a protracted procedure of frequently pressing the softkey buttons repeatedly to select menus and associated submenus before he can execute an operating function associated with a particular on-screen display.

It would be desirable and advantageous to provide an improved to obviate prior art shortcomings and to provide straightforward assignment of an on-screen display to a softkey button in an operator control unit for operating a machine tool, a production machine, a crane and/or a robot.

SUMMARY OF THE INVENTION

According to one aspect of the present invention, an operator control unit for operating a machine tool, a production machine, a crane and/or a robot includes a screen to display an on-screen display when the on-screen display is invoked, an operating button to display a user menu as an on-screen display when the operating button is pressed, and softkey buttons which assign an invoked on-screen display to a softkey button when the softkey button is pressed for a given length of time According to another aspect of the present invention, a machine tool, production machine, crane and/or robot includes a screen displaying an on-screen display when the on-screen display is invoked, an operating button displaying a user menu as an on-screen display when the operating button is pressed, and softkey buttons assigning an invoked on-screen display to a softkey button when the softkey button is pressed for a given length of time.

According to still another aspect of the present invention, a method for assigning an on-screen display to a softkey button in an operator control unit for operating a machine tool, a production machine, a crane and/or a robot, includes the steps of invoking an on-screen display, pressing an operating button so as to display a user menu, pressing a softkey button for a predetermined length of time so that the softkey button is assigned to the invoked on-screen display.

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 1 is a schematic illustration of an operator control unit according to the invention having an on-screen display, FIG. 2 is a schematic illustration of an operator control unit according to the invention having an invoked on-screen display, and FIG. 3 is a schematic illustration of an operator control unit according to the invention having a user menu.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a schematic diagram of an operator control unit 1 for operating a machine tool, a production machine, a crane and/or a robot. The operator control unit 1 comprises a screen 2, softkey buttons 3a, 3b, 3c and 3d arranged outside and at the edge of the screen 2, and an operating button 4. An on-screen display 6 comprising an on-screen function panel 7 and button labeling fields 5a, 5b, 5c and 5d is displayed by the screen 2.

A function ("New", "Open", "Save", "Copy") associated with the on-screen display currently being displayed in each case is displayed in the button labeling fields 5a, 5b, 5c and 5d. In this case the softkey button 3a is assigned to the button labeling field 5a, the softkey button 3b to the button labeling field 5b, the softkey button 3c to the button labeling field 5c and the softkey button 3d to the button labeling field 5d. In the exemplary embodiment, a part program 8, e.g. in the form of a file (file symbol), is currently displayed in the on-screen function panel 7. The respective function is shown in the button labeling fields and is executed on pressing the respectively assigned softkey button. Hence different functions can be assigned to the softkey buttons depending on the on-screen display currently being displayed and will be shown in the button labeling field assigned to the respective softkey button.

By pressing the softkey button 3b, for example, which corresponds to the "Open" function shown in the button labeling field 5b, the file is opened and an on-screen display 6' is simultaneously invoked. As shown in FIG. 2, the on-screen display 6' in turn displays an on-screen function panel 7' and button labeling fields 5a', 5a', 5c' and 5d' together with the program lines 9 of the part program 8 now opened. The softkey button 3a in the on-screen display 6' now has the function 'Select', corresponding to the button labeling field 5a', whereas, for example, the softkey button 3b has the function "Edit" corresponding to the button labeling field 5b'. Pressing the softkey button 3a and 3b executes the corresponding respectively associated function.

The softkey buttons are hence not assigned fixed functions, but these functions can change depending on the on-screen display currently invoked and displayed.

To perform a certain function in the case of commercially available operator control units, the user must often press the softkey buttons to key through various menus, especially their submenus, that exist in the form of different on-screen displays, before he reaches an on-screen display in which he can execute the desired function.

This is where the invention comes into effect. By affording the operator an opportunity for straightforward assignment of a particular on-screen display to a softkey button, the invention provides the operator a quick facility for performing the relevant operating function without needing to use the softkey buttons to key through each of the menus displayed by the on-screen displays before he can execute the desired function.

According to the invention, the operator control unit 1 comprises for this purpose an operating button 4, which is permanently assigned a user menu. In the user menu the on-screen display 6' shown in FIG. 2 that is then currently invoked and displayed on the screen is assigned to a particular selected softkey button. With the on-screen display 6' displayed, the operator presses the operating button 4, where pressing the operating button 4 displays the user menu 10 shown in FIG. 3. The user menu 10 in turn comprises an on-screen function panel 7" and button labeling fields 5a", 5b", 5c" and 5d", which are assigned to the respectively associated softkey buttons 3a, 3b, 3c and 3d. If, for example, the previously invoked on-screen display 6' is to be assigned to the softkey button 3a, then after pressing the operating button 41 the user simply needs to press the softkey button 3a for a certain length of time. In such a way, by pressing the softkey button 3a for a certain length of time, the softkey button 3a is assigned to the invoked on-screen display 6'. A certain period of time is understood to mean in the context of the invention a period of 0.5 seconds to 60 seconds. After the softkey button 3a has been assigned to the on-screen display 6', a symbol 11 for the on-screen display 6' is displayed in the user menu 10 on the button labeling field 5a" associated with the softkey button 3a, in order to indicate to the user that the on-screen display 6' has been assigned to the relevant softkey button.

After pressing the operating button 4, the previously invoked on-screen function panel 7' of the on-screen display 6' is preferably displayed in the user menu 10 as the on-screen function panel 7".

The previously invoked on-screen display 6', as already mentioned, is now assigned the softkey button 3a in the user menu 10. From now on, the on-screen display 6' can be invoked by the operator easily and directly from any displayed on-screen display, and hence from any menu, by the operator pressing the operating button 4 and the user menu 10 being displayed to him after pressing the operating button 4, and, in the user menu, by his then pressing briefly the softkey button 3a already assigned earlier in the user menu to the on-screen display 6'. After pressing the softkey button 3a in the user menu, the on-screen display 6' as shown in FIG. 2 is then immediately displayed to the operator, and he can execute directly the function associated with the on-screen display 6' and shown in the button labeling fields 5a', 5b', 5c', 5d' by pressing the respectively associated softkey buttons 3a, 3b, 3c and 3d. Hence it is no longer necessary to key laboriously through various on-screen displays using the softkey buttons until the operator comes to the desired on-screen display that he can use to execute his desired function; instead, the invention allows the operator to gain quasi-direct access to the on-screen display he currently needs.

Of course where a touch-sensitive screen (touch screen) is used, the softkey buttons can also be displayed in the form of virtual buttons on the screen, and preferably in the position of the button labeling fields so that button labeling fields and softkey buttons form a visual unit.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An operator control unit for operating a machine, comprising:
   a screen displaying an on-screen display when the on-screen display is invoked;
   an operating button invoking a user menu as the on-screen display when the operating button is pressed; and
   softkey buttons that provide respective functions when pressed for a first length of time, said user menu assigning a first on-screen display shown on the screen when the user menu was invoked to a softkey button when said softkey button is pressed for a second length of time while said user menu is displayed as a second on-screen display.

2. The control unit of claim 1 wherein, when said softkey button is pressed for said first length of time while the user menu is displayed as the on-screen display after said soft key button is assigned to invoke said first on-screen display, said first on-screen display is invoked.

3. The control unit of claim 1 wherein the display screen is a touch screen and the softkey button is a virtual button.

4. A machine, wherein the machine is a member selected from the group consisting of machine tool, production machine, crane, and robot, said machine comprising:
   a screen displaying an on-screen display when the on-screen display is invoked;
   an operating button invoking a user menu as the on-screen display when the operating button is pressed; and
   softkey buttons that provide respective functions when pressed for a first length of time, said user menu assigning a first on-screen display that was shown on the screen when the user menu was invoked to a softkey button when said softkey button is pressed for a second length of time while said user menu is displayed as a second on-screen display.

5. The machine of claim 4 wherein, when said softkey button is pressed for said first length of time while the user menu is displayed as the on-screen display after said soft key button is assigned to invoke said first on-screen display, said first on-screen display is invoked.

6. The machine of claim 4 wherein the display screen is a touch screen and the softkey button is a virtual button.

7. A method for providing operator-customizable control buttons for operating a machine including, softkey buttons, an operating button, and a screen providing invokable on-screen displays including label fields for the softkey buttons, comprising the steps of:
- pressing a softkey button for a first length of time to invoke a first on-screen display;
- pressing the operating button so as to invoke a user menu as a second on-screen display;
- pressing a selected softkey button for a second length of time while the user menu is displayed as the on-screen display so as to assign the selected softkey button to invoke the first on-screen display.

8. The method of claim 7 further comprising the step of pressing the selected softkey button for the first length of time while the user menu is displayed as the on-screen display after the selected soft key button is assigned, so as to invoke the first on-screen display.

\* \* \* \* \*